UNITED STATES PATENT OFFICE.

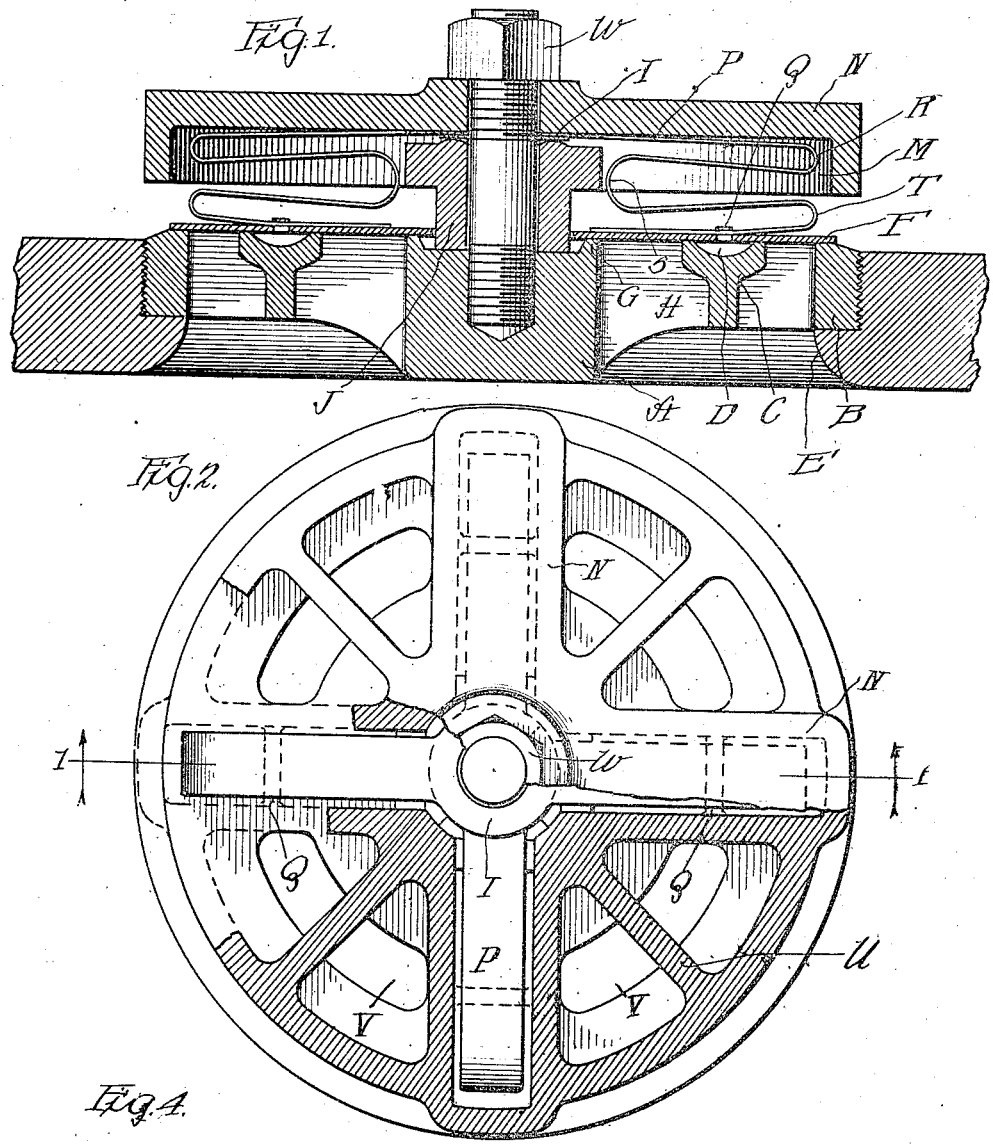
C. H. LEINERT.
VALVE FOR COMPRESSORS.
APPLICATION FILED NOV. 29, 1915.
1,240,461.
Patented Sept. 18, 1917.

CHARLES H. LEINERT, OF CHICAGO, ILLINOIS.

VALVE FOR COMPRESSORS.

1,240,461. Specification of Letters Patent. Patented Sept. 18, 1917.

Application filed November 29, 1915. Serial No. 64,188.

*To all whom it may concern:*

Be it known that I, CHARLES H. LEINERT, citizen of the United States, residing at Chicago, in the county of Cook and State of Illinois, have invented certain new and useful Improvements in Valves for Compressors; and I do hereby declare the following to be a full, clear, and exact description of the invention, such as will enable others skilled in the art to which it appertains to make and use the same.

This invention has for its object to provide an improved check valve for so-called blowers, or air compressors, the object being to provide a device of this character which is cheap, efficient and easily and quickly repaired or renewed; in which the springs for maintaining the valve normally on its seat are so constructed and mounted as to provide practically no friction or rubbing contact with the parts with which they are engaged; in which the springs are relatively so arranged as to permit the valve to be freely moved axially of its seat and uniformly held upon the latter at all points; in which the springs guide the valve in its movements independently of other means; and in which the springs are housed to protect them from the hot air discharged from the blower or compressor.

A suitable embodiment of the invention is illustrated in the accompanying drawings in which:

Figure —1— is a central vertical longitudinal section of a check valve constructed in accordance with my invention showing the same mounted in a wall of the cylinder or cylinder head of a compressor or blower.

Fig. —2— is a top plan view of the same partly in section.

Fig. —3— is a detail perspective view of a spring and valve-engaging member employed.

Fig. —4— is a fragmentary detail view of the valve showing the central opening therein.

The blowers of the type to which this invention particularly relates are used very extensively to discharge relatively large volumes of air at relatively low pressure, and such blowers are usually operated at a relatively high speed so that the check-valves controlling the inlet and discharge ports for air are reciprocated at comparatively high speed which obviously subjects them to a great deal of wear, thus causing them to easily wear out and requiring that they be frequently renewed.

The object of my present invention is, therefore, to provide a check-valve adapted for blowers and compressors of this class which is very cheap, efficient and may be easily and quickly repaired or renewed at frequent intervals so as to prevent the engine being maintained idle for more than an immaterial period.

Referring now to the drawings, A indicates a valve seat member which is of skeleton form, and comprises a hub, a rim B which in the instance illustrated is externally threaded, and an intermediate annular seat member C, having an annular groove D in its outer face. The rim B is adapted to engage in the enlarged threaded portion of the opening E in the cylinder-head or circumferential wall of the cylinder of the blower or compressor, and one face thereof constitutes a seat for the valve F which preferably consists of a thin disk of sheet metal, or other suitable material. The said disk F is adapted to seat on the flange G of the hub of said valve seat member and on the annular edges bordering the annular groove D of the member C and upon the rim B all of said parts being, of course connected with each other by means of spokes H in a well-known manner.

Threaded into the said hub of the member A is a bolt I upon which there is loosely mounted a fastening member J, the lower or shank portion of which is substantially cylindrical, but is provided with diametrically opposite flattened portions K, said member having a central opening to receive the bolt I, and being provided with two pairs of diametrically opposed projections L which are adapted to engage in the inner ends of the channels M of a member N, the latter having a central opening adapted to receive the outer end portion of the bolt I. The said member J is further provided on its upper face with ribs O upon which the middle portions of flat springs P are adapted to rest.

The said springs P are arranged in pairs integral with an enlarged middle portion. The free arm of each of said springs P is is adapted to be engaged with the disk F, and the middle or bridge portions of said springs are adapted to be disposed between the members J and N and clamped between the opposed surfaces of the member N and the ribs O to be held securely in place. Each of said springs consists of a flat strip of metal bent to zig-zag form simulating the letter "W" or "M". The engagement of the free arm of each of said springs P with the disk F is effected by cutting parallel slits in said disk at diametrically opposite points and off-setting the strips Q bordered thereby, a distance sufficiently high above the disk F to provide slots in which said end portions of the springs are adapted to be received.

It will be seen that each spring has three convolutions R, S and T respectively, the convolutions R and T being each substantially one-half the radius of the convolution S, this being necessary to give the spring the free action which enables it to collapse under the influence of the pressure on the disk F so as to have no radial movement relatively to said disk, said springs being adapted when folded or collapsed to the utmost extent required, to lie entirely within the channels M while the disk seats upon the rim portion of the member N, and the lower faces of the projections L and the side walls of the channels M. The rim portion of the member N is substantially circular, as shown in Fig. —2—, and is connected, midway between its points of juncture with consecutive channels M, with the middle portion by means of the spokes U, thereby providing a pair of triangular openings for each quadrant of said member N. The said disk F is provided with a plurality of segmental slots V which are opposed, when said disk is seated, to the annular groove D of the part C, and thus provide no openings for the admission or escape of air when said disk is seated on the member A, but which, when said disk F leaves said seat, constitute openings through which the air is adapted to pass either into or out of the cylinder, according as the valve is used in the suction or discharge end of the same. When used in the discharge end, as shown in Fig. —1—, the disk F is unseated by pressure on its inner face whereby it is moved toward and sometimes seats upon the opposing seat surfaces of the member N, whereby air discharged from the cylinder is caused to pass through said openings V and the triangular openings in said member N, while other air discharged passes around the outer edge of the disk F. When the said disk or valve F is lifted from its seat it obviously causes the springs P to become folded or collapsed substantially into the channels M, and the openings V, it will be seen, are so located as not to cause such air to pass into said channels. The air discharged is frequently of a relatively high temperature, and by means of my arrangement the springs are protected from such heat to an extent sufficient to prevent the same being burned out or their temper drawn.

It will be seen, of course, that the nut W serves to clamp the member N down upon the middle portion of the springs and the latter down upon the ribs O of the member J, and the said member J upon the middle portion of the hub of the member A, so that all of said parts are securely held in proper relative position by said nut. The disk or valve F is provided, as shown in Fig. —4—, with an opening adapted to receive the shank portion of the member J, and by the flattened sides of the opening coacting with the flattened portions K of the member J, said valve will be held against rotation relatively to said member. The said member J is in turn held, by means of the projections L, against rotation relatively to the disk or valve F to an extent sufficient to distort the springs, and the latter by acting, as before stated, to cause the disk to move axially relatively to its seat, prevents wear by frictional contact of the walls of the central opening in the disk F with the shank portion of said member J. The springs P are preferably relatively wide and will thus resist lateral distortion more effectually than narrower springs will and will also more effectually resist longitudinal movement of the arms connected with the disk F relatively to the bridge portion or arm held rigid with the member N.

When it is desired to renew the valve or any of the springs for holding the same normally upon its seat the nut W and member N are removed. The member J and springs and disk F are then removed and the repair effected by merely removing a broken spring and renewing the same, or removing a worn out disk F and renewing the same, which is obviously easily accomplished by withdrawing the end portions of all of the springs from the slots formed by the off-set members Q thereby releasing the disk F, and, by then engaging said portions in a new disk, the latter is easily and quickly mounted in a position whereupon the parts are replaced on the member A, the whole operation requiring only a very few minutes.

As previously stated the springs act to guide the valve in its reciprocal movements and maintains the same out of contact with the shank of the member J so that it moves very freely and without friction. In the event that one of the springs should break, however, the valve would obviously tend to move laterally during reciprocation because of the unbalanced or unequal pressures exerted thereon and in that event the central opening in the valve will coact with its guide to prevent such lateral or torsional movement and also to prevent the valve dropping out in case all springs should break.

I claim as my invention:

1. In a check-valve for blowers and compressors, a reciprocable valve, a stop-member for limiting the opening movement thereof, and a plurality of springs for maintaining said valve on its seat, said springs each consisting of a flat strip of metal bent zig-zag to provide a plurality of leaves, the end leaves thereof detachably engaged with said valve and said stop member, there being raised straps on the valve beneath which the ends of respective springs are received and held.

2. In a check-valve for blowers and compressors, a reciprocable valve, a stop-member for limiting the opening movement thereof, and a plurality of springs for maintaining said valve on its seat, said springs each consisting of a flat strip of metal bent zig-zag to provide a plurality of leaves, the end leaves thereof detachably engaged with said valve and said stop member, said valve provided with raised portions forming slots for receiving and removably holding the ends of respective springs.

In testimony whereof I have signed my name in presence of two subscribing witnesses.

CHARLES H. LEINERT.

Witnesses:
  M. M. BOYLE,
  R. W. LOTZ.